United States Patent Office

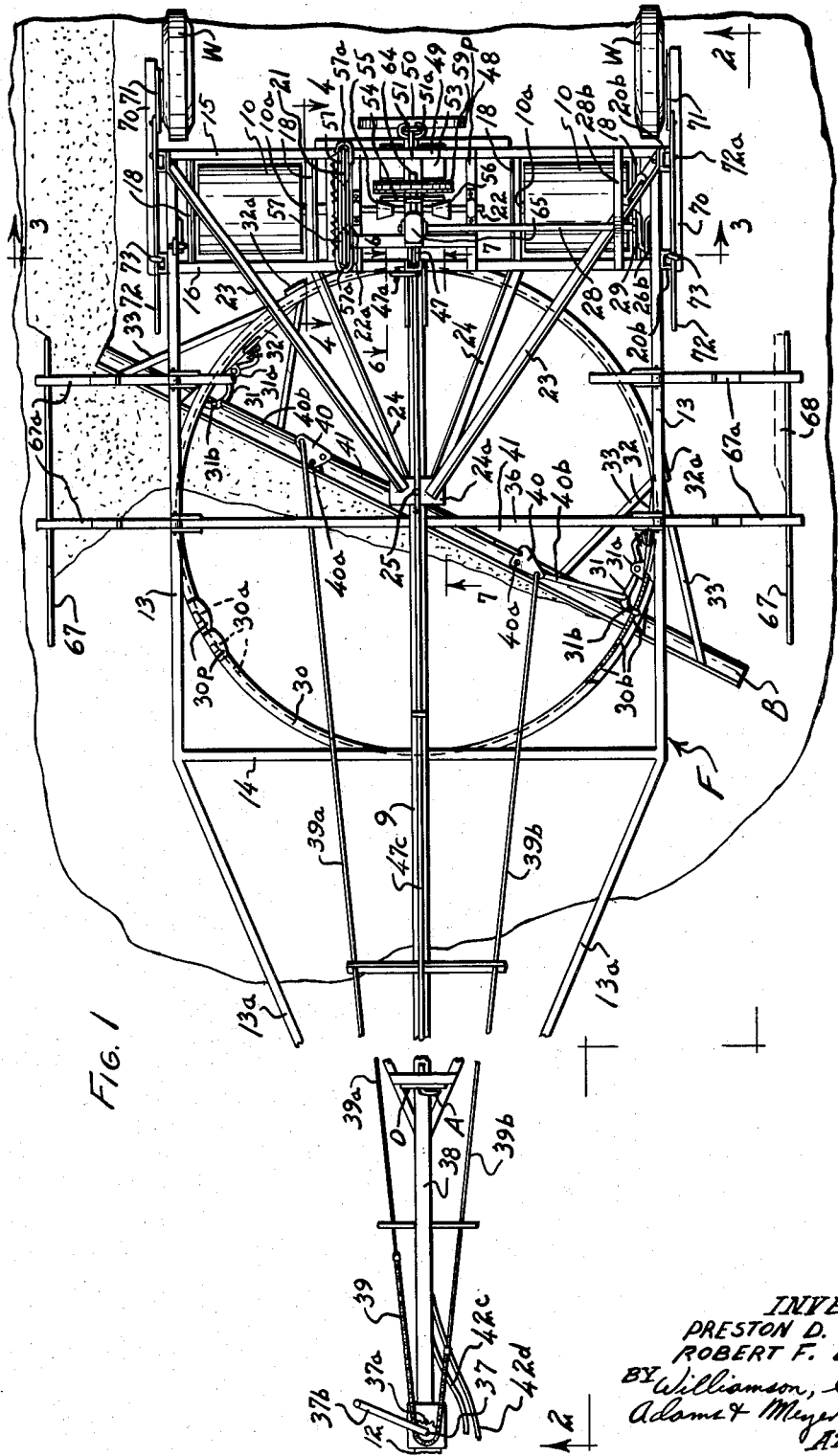

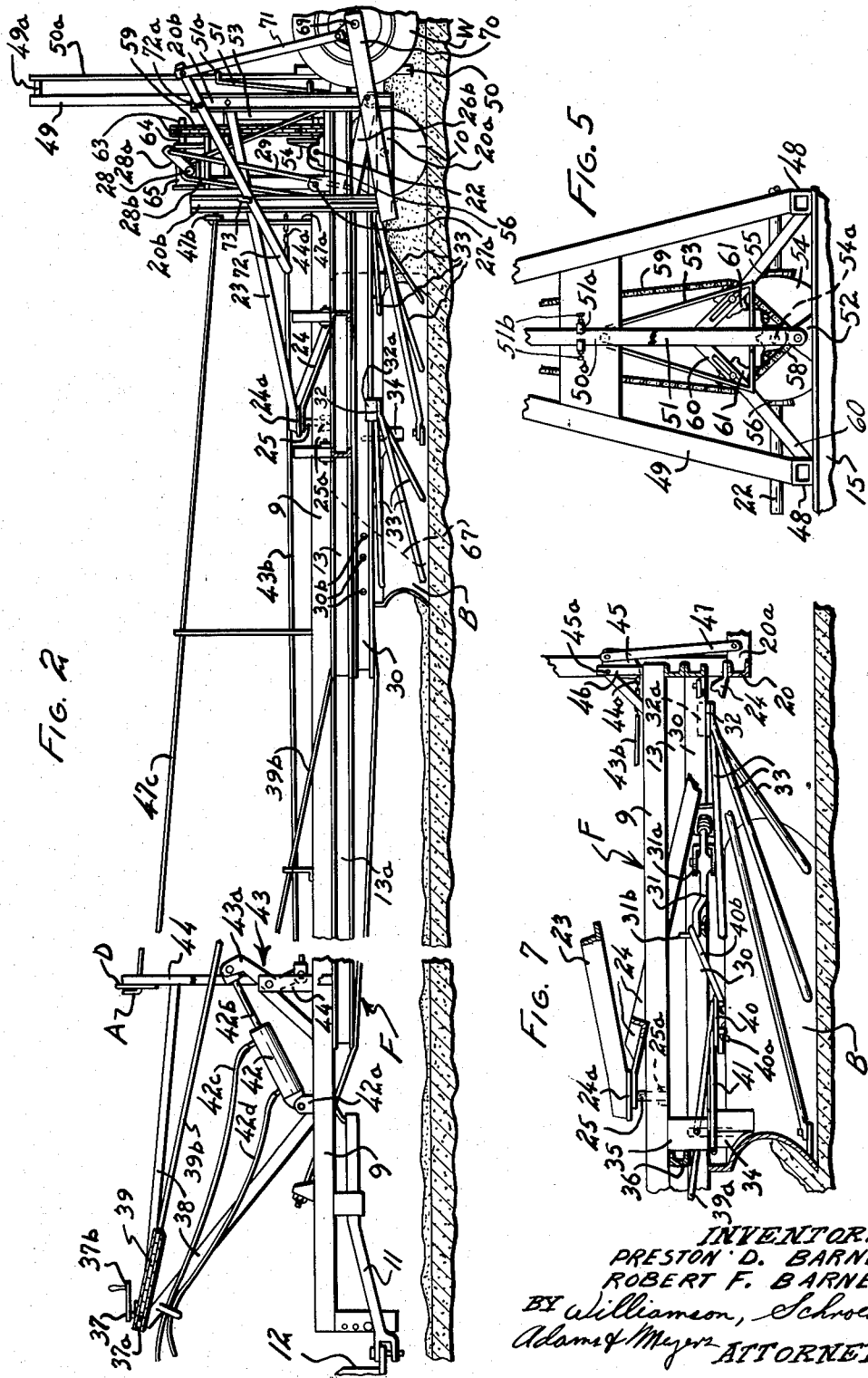

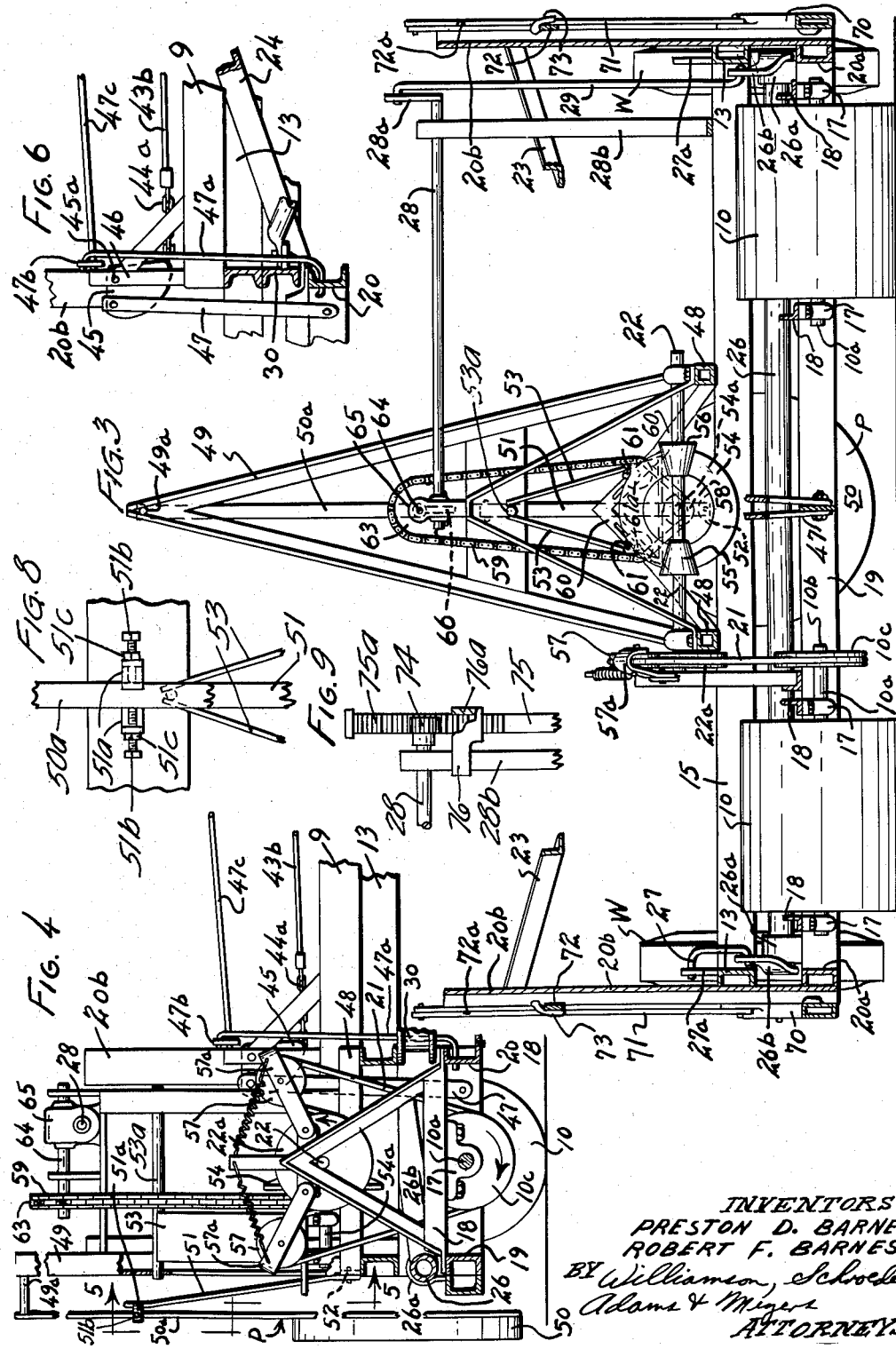

2,964,864
Patented Dec. 20, 1960

2,964,864

MACHINE FOR LEVELING, BORDERING, GRADING AND MOVING SOIL WITH AUTOMATIC BLADE LEVELING

Preston D. Barnes and Robert F. Barnes, Hartman, Colo.; Robert F. Barnes assignor to Preston D. Barnes Filed Mar. 14, 1955, Ser. No. 494,163

8 Claims. (Cl. 37—168)

This invention relates to machinery for working, moving, grading and leveling soil and dirt in land leveling and grading operations in general, and has particular applicability to soil irrigation projects where preparation of fields and strips of fields with bordering of the strips is essential to simplify and render efficient irrigation.

It is a general object of our invention to provide a machine which may be pulled or driven over the ground and which in operation may be used to grade, to smooth or plane, and to move dirt or soil and border the same at one end of a blade, and which further, when desired, will automatically level and border a strip of land or soil, and also terrace the same.

More specifically, it is an object to provide in a machine of the class described, automatic blade-leveling mechanism which is responsively controlled by a gravity shiftable element to the end that regardless of the travel of a pair of wheel drums or other ground-engaging supporting means over uneven ground, the earth-working blade disposed in advance of said ground-engaging supporting means will always be maintained in a predetermined, truly horizontal position and at a predetermined depth.

A further object is the provision of soil working machinery of the type described wherein the automatic leveling mechanism and its cooperation with the frame and earth working blade of the machine may be simultaneously applied during bordering operations upon a field or strip, and may nevertheless be rendered inoperative when it is desired to grade the land or float or plane loose soil.

A still further object is the provision of a readily transportable machine of the type described having controls and adjustments conveniently operable from a forward driver's seat to produce adjustment of the depth of the earth working blade as well as adjustment of the angulation of this blade with reference to the line of travel of the machine over the ground.

A more specific object is the provision of an automatic leveling machine for use on soil and ground in leveling and border operations, wherein a compensatory blade-supporting frame and the axis of the ground-engaging supporting medium of the machine is immediately set in operation to maintain the earth working blade at a predetermined depth and level regardless of travel of the ground-engaging supporting means over unlevel or irregular terrain.

These and other objects and advantages of the invention will more fully appear from the following description made in connection with the accompanying drawings, wherein like reference characters refer to the same or similar parts throughout the several views, and in which:

Fig. 1 is a top plan view of an embodiment of the invention in operation for bordering and leveling a strip of land;

Fig. 2 is a side elevation of the same;

Fig. 3 is a vertical section taken on the line 3—3 of Fig. 1 looking in the direction of the arrows and showing the automatic leveling mechanism for the most part in front elevation;

Fig. 4 is a vertical section taken on the line 4—4 of Fig. 1, showing a greater part of the automatic leveling mechanism in side elevation;

Fig. 5 is a fragmentary rear elevation showing the self-leveling pendulum and its connection with other essential elements of the self-leveling mechanism;

Fig. 6 is a fragmentary vertical section taken approximately on the line 6—6 of Fig. 1, showing the depth control adjustment for the earth working blade;

Fig. 7 is a vertical section taken on the line 7—7 of Fig. 1 looking in the direction of the arrows and showing mounting of the blade for angular adjustments, bracing of the blades and trailing connection of the rear drum-wheel assembly with the rear portion of the frame;

Fig. 8 is a detail, rear elevation showing adjustment means between the pendulum rod 50a and the shiftable control lever 51; and Fig. 9 is a detail view showing an alternative actuating connection between an overhead driven shaft and the rear axle housing unit for tilting the main frame relative to the rear axle unit.

Referring now to the embodiment illustrated in the accompanying drawings.

Frame and chassis

While it will be understood that our improved machine may be self-propelled, in the form shown, its frame and chassis is in the style of an elongated draft vehicle comprising a main frame F adjustably supported at its wider and rear end upon a pair of transversely spaced, ground-engaging elements such as the drum wheels 10 and having central draft connections 11 at its diminished and forward end for coupling with and support from a rear draft member 12 secured to the chassis of a tractor or other self-propelled traction vehicle (not shown). It is desirable to have the ground-engaging, supporting means 10 and the position of the earth-working blade B of our machine spaced a substantial distance behind the support of the front of frame F or its coupling with the tractor in order that the depth of the blade will not be appreciably influenced by transverse undulations in the terrain over which the propelling vehicle and/or front supports travel. To this end, it is desirable that the overall length of the machine and frame be within a range of 18 to 30 feet although variations may be made without in any way departing from the scope of our invention.

The main frame F which has a level-compensatory relation with the axle structure for the transversely aligned drum wheels 10, as shown, comprises a pair of substantially horizontal, longitudinal channel members 13 spaced widely apart (preferably a distance of at least ten feet) and extending in parallel relation throughout nearly the rear half of the length of the machine and then converging symmetrically in the forward portions 13a to the draft-connection forward extremity of the frame. The longitudinal frame channels 13 are rigidly interconnected and braced at the intermediate portion of the frame by a transverse cross beam 14 and are further interconnected and rigidly braced at their rear ends by a cross channel 15. An additional transverse channel beam 16 rigidly interconnects the rear portions of longitudinal channels 13 along a line disposed as shown just forwardly of the drum wheels 10, beams 15 and 16 serving as a support for our automatic leveling mechanism (later to be described).

A heavy, longitudinal, central frame beam 9 extends substantially the full length of the frame and is rigidly secured to the top of cross beam 14 and cross channel 16 and at its forward portion, is welded or otherwise rigidly secured to the converging forward ends of side channel portions 13a. V-belt 21 at the upper corners thereof, is also trained about idler-tightener sheaves 57 mounted on the outer portions of arms 57a which are pivotally connected at their inner ends to an upstanding frame structure (see Fig. 4).

The drum wheels 10 of the chassis are affixed to coaxially journaled stub axle shafts 10a, said shafts being journaled in suitable bearings 17 which are mounted in two sets of short, longitudinally extending bars 18 interconnecting a heavy, transverse, rear axle channel 19 with a forward axle channel 20 (see Figs. 3 and 4). Said axle channels are interconnected at their end portions by short, heavy channel members 20a, thereby completing a rectangular, reinforced frame for the axle and drum wheel assembly. Just outwardly of the rear portions of frame channels 13, upstanding posts 20b are welded or otherwise rigidly connected to channel members 20a.

One of the stub axle shafts 10a has affixed to its inner extension 10b, a V-belt driving sheave 10c, having trained thereover, an endless V-belt 21 which is also trained about a driven sheave 22a affixed to a cross shaft 22 forming an element of our leveling mechanism.

The drum-wheel frame and axle assembly is connected in trailing fashion with the rearward portion of the main frame F with freedom of limited vertical adjustment between the wheel-drum, axle assembly and frame F, as shown, through the medium of two sets of forwardly converging draft beams 23 and 24, the forward converging ends of said draft beams being welded or otherwise rigidly affixed (Figs. 1, 2 and 7) to a common block or plate 24a from which vertically depends a king bolt 25 seated in a socket 25a formed in the rearward portion of the elongated, central beam 9. The rear ends of draft beams 23 are fixed respectively to the upper portions of the rearwardmost upstanding posts 20b of the drum and wheel assembly, while the rear ends of the lower draft beams 24 are secured to the transverse, forward axle channel 20. Mechanism for varying the supported relation of the rear end of main frame F from the drum-wheel and axle assembly will later be described, such mechanism being controlable from the front end of the frame to adjust the depth of the earth-working blade since the blade, as will later be shown, is directly mounted beneath the rear portion of the main frame.

It is essential that the main frame F be connected with and supported from the drum-wheel and axle assembly with freedom of relative tilting of the main frame with respect to the axle structure, along axes longitudinal of the frame and generally parallel to the line of travel of the machine. The king bolt connection 25 of the draft beams 23 and 24 is sufficiently loose to permit very limited tilting of said main frame for self-leveling purposes but a compensatory mechanism is required in the embodiment illustrated to retain one side of frame F in a then predetermined, vertical relationship with the axle assembly while providing for variation or adjustment in the vertical relationship between frame and axle assembly at the opposite side of the machine.

Rear equalizer structure

To the foregoing end, we employ an equalizer structure between the axle mounting for the drum wheels 10 and the rear end of frame F to enable tilting of frame F relative to the axle structure to be accomplished when automatic leveling of the blade B is desired in certain operations and to nevertheless facilitate and effect parallel connection of frame F with the axle structure in floating, planing, grading and dirt-moving operations. Above rear axle channel 19 is journaled in suitable bearings 26a, a heavy, transverse stabilizer shaft 26 having affixed to the outer ends thereof, short, forwardly extending radial equalizer arms 26b which may be fixedly interconected at their outer ends with the rear of frame F through U-shaped links 27 when the machine is used for purposes where automatic leveling is not desired and one of which links as shown in the drawings, has been removed from its upper end connection with a rigid, vertical frame tongue 27a to interconnect that stabilizing arm 26b at its outer end with a level-adjusting crank arm 28a affixed to the outer end of a transverse, horizontal crank shaft 28. The said "leveling" connection between crank arm 28a and equalizer arm 26b therebelow, is made through a depending, substantially vertical link 29 (see Figs. 2 and 3). Tongues 27a are welded or otherwise rigidly connected to frame 13. Fig. 3 shows the equalizer structure operatively connected for leveling operations. In addition to the link connections referred to and equalizer structure, additional means for interconnecting the rear of frame F with the axle mounting for obtaining adjustment in blade depth and to facilitate the cradled, self-leveling action, will be described later.

Blade mounting and blade adjustments

The elongated blade B which may conveniently be from 12 to 16 feet in length, is of the general construction of blades used in road graders, having its concave surface disposed forwardly and provided with an earth-cutting edge along the entire lower edge thereof. Blade B is mounted for pivotal and angular adjustment below a substantially horibontal, circular track 30, which may be in the form of a circular channel having the intermediate web thereof disposed inwardly for slide engagement with the detent ends of a pair of latch dogs 31 which are pivotally mounted on short brackets 31a secured to braced blade guides 32 (see Figs. 2 and 7), which have overhanging track-engaging flanges 32a supported upon the external, lower, horizontal and annular flange or web of the track channel 30. Two of said blade guides are employed in the embodiment shown, extending some distance rearwardly of blade B and rigidly interconnected with the back portions of the blade by a plurality, in each instance, of diagonal brace bars 33 (see Fig. 1).

In addition to the blade guides 32, a central, pivotal mounting is provided for blade B. As shown (see Fig. 7), a heavy mounting block 35 is fixed to a cross beam 36 of the frame having a socket therein for receiving the upstanding, heavy post 34 (see Fig. 2) which is affixed to the center and rear side of the upper edge of blade B. Suitable retaining means are provided for engaging the upper end of the post to retain the same in its journaled relation within block 35.

Blade adjustment mechanism is provided, controllable from the front extremity of the frame and from the driver's seat of the propelling tractor. To this end, a vertical stub crank shaft 37 is mounted on the upper and forward end of an inclined, rigid, longitudinal frame member 38, said shaft having fixed thereto adjacent its upper end, a sprocket 37a about which a chain section 39 is trained, the ends of said chain section being connected by rods or other linkage elements 39a and 39b respectively with bell crank latch-operating plates 40, spaced equi-distant outwardly from the longitudinal cented of blade B. Each of said bellcrank plates 40 is pivoted to the rear side and top portion of blade B on a pin 40a. The plates 40 are interconnected by a straight link 41 for opposite swinging in unison and for equalization. The working arm of each of the triangular plates 40 is connected by a link 40b with one of the latch dogs 31 (see Fig. 1). It will be noted that the respective links 40b which actuate and retract dogs 31 are connected at their inner ends on substantially the same pivots as the connection of the linkage elements 39a and 39b and when the dogs are engaged for interlocking, are disposed in a neutral position so that because of forward pivoting of the plates 40 and the pivots 40a, will produce inward withdrawal of the dogs whether the plates 40 are swung clockwise or counterclockwise. When crank shaft 37 is turned through its crank handle structure 37b, the chain section 39 is wound on sprocket 37a in one direction or the other and pull is imparted to either the control rod 39a or the control rod 39b as the case may be. This action swings the two bell crank plates 40 in similar directions simultaneously first retracting the detents of dogs 31 and thereafter, oscillates the blade and adjusts the same in one direction or the other. The blade is guided in such adjustment movements by its central pivot 34 and the two widely and arcuately spaced guide flanges 32a which engage externally the circular track 27. It will be apparent that both of the dogs 31 are urged into detent-engaging position by coil springs at their rear ends and the detents or teeth of said dogs are retracted whenever the bellcrank plates 40 are moved from the normal positions shown in Fig. 1. That is, whether the bellcrank plates are swung rearwardly or forwardly relative to normal positions, the pull is imparted upon the connecting rods 40b retracting the detents of the dogs.

The locking dogs 31 cooperate with sets of apertured portions or sockets 30a and 30b formed respectively on the right hand and left hand internal portions of track 30, to lock the blade B in a plurality of differently angulated positions, including a position perpendicular to the line of travel of the machine, and positions at 45° and 60° angle to the line of travel. Control of the adjustment of blade B from the forward end of the machine through crank 37, sprocket chain 39 and link rods 39a and 39b causes, during initial turning as has been explained, the retraction of the detents of locking dogs 31 with engaged locking sockets 30a and 30b, and thereafter swinging of the blade is accomplished on the heavy blade pivot 34 with the assistance of the overhanging guide flanges 32a with which brace arms 33 for the blade, are connected.

In the oblique adjustments of the blade relatively to the line of travel, means are provided (requiring in the embodiment shown manual manipulation) whereby selective positioning and locking of the blade may be assured. To this end, swingable cam plates 30p (see Fig. 1) are hinged to appropriate portions of the top of track 30 above the respective detent sockets 30a and 30b, having inner curved camming edges which protrude inwardly a short distance beyond the inner periphery of track 30, and which, when the plates are flipped down to the position shown in Fig. 1, engage upstanding cam pins 31b affixed near the ends of locking dogs 31. Thus, when it is desired to adjust and lock the blade in a predetermined oblique angled position, the appropriate plate 30p is lifted upwardly and outwardly to inactive position at one side of the track and corresponding plate 30p is likewise lifted on the opposite side of the track. Thereafter the swinging of blade B through the windlass mechanism including crank 37 and the link rods 39a and 39b, proceeds until the detents of dogs 31 move to and engage the appropriate locking socket.

Blade depth adjustment

The blade B and its mounting track are directly supported as has been recited, from the bottom of the main frame F. This frame at its rear end, as has been recited, is supported for variable vertical adjustment from the axle and drum-wheel assembly. The equalizer mechanism previously described enables cradling and tilting adjustment of the main frame to be made relative to the axle assembly, along axes disposed longitudinally of the machine.

It is essential that efficient means be provided for varying the general height of the rear of main frame F relative to the axle and wheel assembly for the purpose of raising or lowering the cutting edge of blade B in its relation with the soil or dirt. To this end (see Figs. 2, 6, 7 and 1), we provide at the front of frame F mounted upon the central longitudinal, frame beam 9, a hydraulic jack mechanism 42, the cylinder of which is pivoted at its forward end to an upstanding lug 42a, and which has a rearwardly directed piston and piston rod 42b, said rod being connected with the upper end 43a of a bell crank lever 43 intermediately fulcrumed on a rigid upright 44 affixed to beam 9. The lower end of bell crank lever 43 is pivotally connected with the forward end of a pull-rod 43b, which at its rear end, is adjustably connected by a chain section 44a with a depending bell crank lever plate 45 pivoted at 45a to an upstanding short post 46 affixed and braced to the rear end of the elongated central frame beam 9. The rearwardly projecting arm portion of bell crank plate 45 is pivoted to the upper end of a thrust link 47 which at its lower end, is pivotally connected with the drum wheel assembly structure 20 through the intermediary of a longitudinal frame member 20a (see Fig. 7) at the forward portion of the axle and drum-wheel assembly. Thus, downward thrust on link 47 controllable from the hydraulic jack mechanism at the forward end of the machine, elevates the rear end of the main frame relative to the axle-wheel assembly, and varies the positioning of the lower edge of ground-working blade B. This adjustment and consequently, the depth of blade B is indexed to a dial D carried on the upper end of forward post 44 through a depending link 47a connected at its lower end with the forward axle assembly and at its upper end with a crank arm 47b, fixed to the rear end of a long, oscillatory rod 47c, having an indicator arrow A affixed to the forward end thereof and overlying the indicating dial D. The interior of the cylinder of the hydraulic jack 42 for controlling blade depth is connected at opposite sides of the piston with the hydraulic pump and system of the tractor through hydraulic hose connections 42c and 42d, respectively.

Automatic leveling mechanism

A pendulum-controlled, power-driven, automatic leveling mechanism is supported and mounted on the rear of the main frame F of the machine, being operative to tilt or rock with cradle motion, the main frame and consequently the lower edge of blade B in opposite directions and along longitudinal axes relative to the common axis or axle structure of the rear drum-wheels 10. Thus through the cooperation of the equalizer mechanism previously described, compensation is made for travel of one or the other of the drum-wheels over irregularities, humps or depressions in the ground over which said wheels travel, to constantly maintain the cutting edge of the blade at the desired predetermined horizontal level.

Our automatic leveling mechanism and the control pendulum P is mounted on an upstanding framework supported centrally from the rear end of frame F and as shown, having the frame parts secured to a pair of spaced, longitudinally extending supporting bars 48. Pendulum P is supported as shown from a rear A-frame 49, carrying at its upper apex a heavy pivot pin 49a from which the pendulum link is suspended. The substantial weight 50 of the pendulum, as shown, is in the form of a disc which as suspended, is disposed behind the rear of the frame and axle assembly, free to swing transversely of the line of travel through action of gravity. The intermediate portion of the pendulum rod 50a is engaged with provision for limited adjustment, by the confining arms 51a of a shift lever 51 (see Figs. 4 and 5) pivoted at its lower end to a lug 52 and extending outwardly therefrom as shown in Figs. 3 and 4. Confining arms 51a are part of a bracket identified as an entirety by the letter Z attached to the upper extremity of shift arm 51. The confining arms 51a, as shown in Fig. 8, are spaced considerably farther apart than the width of pendulum rod 50a and are each provided with adjustment screws 51b and lock nuts 51c to vary aligned or slightly disaligned relationship of the pendulum rod 50a and control link 51. Upstanding control link or lever 51 forms a part of a laterally shiftable frame which includes a triangular supporting member 53 (Figs. 3 and 4) pivoted at its upper end by a horizontal pin 53a journaled in the A-frame 49. Triangular member 53 has at its lower portion, a pair of aligned bearings (not shown) spaced longitudinally of the frame, in which bearings a relatively large, power-transmitting element in the form, as shown, of a cast bevel disc 54 is suitably mounted facing forwardly of the machine and affixed to a journal shaft 54a. The bevel disc is thus shiftable laterally of the frame with the slight swinging movement of pendulum P in one direction or the other, and is normally positioned when the drum-wheels 10 of the machine travel over smooth, horizontal ground, between and in slightly spaced relation to a pair of relatively small, widely spaced, transverse power-driven bevel discs 55 and 56 respectively. In the swinging of pendulum P and with it shift lever 51, since the pendulum rod 50a is confined between the adjustable confining screws 51b located on bracket Z at the upper end of shift arm 51, the swinging of the pendulum moves the beveled disc 54 one way or the other transversely of the machine because the disc is journaled and indirectly mounted upon the triangular shiftable frame 53. Elements 55 and 56 are affixed to the short transverse driven shaft 22 which, as previously recited, is constantly driven during forward travel of the machine by V-belt from a sheave 10c affixed to the inner end of the right-hand axle shaft 10a (Figs. 3, 4, 5). The V-belt 21 (Fig. 4) is trained at its upper reaches about idler belt-tightening pulleys 57 and thereafter passes downwardly and is entrained upon the large driven sheave 22a of transverse shaft 22. The bevel elements 55 and 56 are constructed of such material as leather laminations. Shaft 54a of the large bevel disc 54 has affixed to the rear end thereof, a small sprocket 58 (see Figs. 3 and 5) about which is trained the lower bight of an endless roller chain 59. An inverted angle frame 60 has its lower ends or legs rigidly affixed to rear longitudinal members 48 of the machine frame (Figs. 4 and 5) and has adjustably mounted therein in slots near the apex thereof, stub shafts 61a of a pair of idler sprockets 61 about which the roller chain 59 is trained, said chain passing upwardly from sprocket 61 to engage and drive a sprocket 63 (Fig. 3) which is affixed to the rear end of a longitudinally extending stub shaft 64, suitably journaled in a worm gear transmission housing 65 (Fig. 4). The forward end of stub shaft 64 carries a worm gear (within housing 65) which is in mesh with worm 66 affixed to the inner end of crank shaft 28 (Figs. 3 and 4). The outer portion of shaft 28 is journaled in a braced post 28b affixed to the left side of the rear end of the main frame, and has at its extremity a crank arm 28a which is connected, as shown in Fig. 3, by a depending elongated link 29 with the equalizer arm 26b at the left side of the rear of the machine.

In Fig. 9, an alternative connection between driven shaft 28 and equalizer arm 26b is shown. Here shaft 28 is provided at its outer end with a fixed pinion 74 which engages the rack 75a of an elongated depending link 75, the lower end of which is connected with equalizer arm 26b. To properly confine and guide link 75, suitable means is provided such as the bracket 76 affixed near the upper end of post 28b and having a slide bearing 76a conforming to the cross-sectional shape of link 75 and guiding the same and holding the rack in mesh with pinion 74.

Idler sprockets 61 are very important in that the moment pendulum rod 50a is slightly shifted to cause initial engagement between bevel disc 54 and one of the spaced small driving elements 55 or 56, the sprocket 58 concentrically affixed to the large bevel disc will creep upon and step towards one or the other of said sprockets 61, thereby positively assuring proper driving engagement. In other words, with our automatic leveling mechanism, the pendulum 50 and pendulum rod 50a merely swing slightly when unlevel ground is traversed by the two drum wheels 10, thereby shifting slightly the shift lever 51 which in turn is connected with and shifts bevel-disc-carrying triangular frame 53 to cause initial driving engagement between one of the two spaced revolving driving elements 55 and 56 and thereby initial turning of large bevel disc 54. Immediately upon said initial driving of disc 54, the concentrically affixed small sprocket 58 creeps upon or steps into one of the short, upwardly inclined runs of the lower portion of endless chain 59, thereby assuring and maintaining positive driving engagement of the chain until the pendulum is again shifted to a neutral position.

*Bordering mechanism*

In Fig. 1, our machine is illustrated with bordering wings 67 attached and cooperatively associated with the obliquely positioned blade B and the automatic leveling mechanism to produce, in travel of the machine, a substantially uniform border within the height range desired. Wings 67 are rigidly affixed as shown to the outer ends of a pair of spaced rigid arms 67a, which are hingedly connected at their inner ends to the top of the heavy side channel frame members 13, thereby affording provision for swinging backwardly the wings and arms when bordering is not desired.

With the lower edges of said bordering wings 67 disposed by gravity at ground level, the amount of soil or dirt passing rearwardly between the rear end of the oblique leveling blade and the adjacent wing making the border, is controlled by the cooperation of blade and wing, the factors of depth at the cutting edge and angulation of blade B being, of course, taken into consideration.

Thus, as shown in Fig. 1, the machine is illustrated in use for leveling a strip of land and simultaneously forming a border at the right side of the machine. Material, as illustrated, accumulates between the inner surface of the right-hand bordering wing 67 and the rearward portion of the blade, its discharge rearwardly being controlled by the spaced relation at the apex formed between said two elements. Ordinarily for irrigation projects, borders varying from 4 inches to 10 inches in height may be desired. By setting the blade rather deeply, more material is plowed and a border having a center line or crown of greater height is produced. The width of the border may also be controlled by varying the spaced relation between the rear portion of the bordering wings 67 and the rearward end of the blade. To this end, removable elongated spacers 68 (one being shown in dotted lines on the left-hand bordering wing not in use) may be applied to restrict said spaced relation.

*Transportation wheels*

For the purpose of readily transporting the machine from one field or one position to another without operation of the working mechanism, we provide liftable ground-engaging wheels W at the extreme rear of the machine preferably equipped with large pneumatic tires and journaled on coaxial stub shafts 69 which are transversely mounted in the rear ends of swingable mounting arms 70, said arms being intermediately pivoted to the side structure of the frame for the axle and drum-wheel assembly. A separate toggle mechanism for each of the wheels W is provided, comprising a depending toggle link 71 pivoted to the short end of an elongated lever 72, which lever is fulcrumed on a pivot pin 72a, to the upper portion of one of the rear posts 20b of the axle assembly.

In Fig. 2, the wheels W and associated mechanism are shown in elevated position several inches above the ground line with the handle ends of the lever 72 retained beneath retaining hooks 73. From this position, by releasing the two wheel operating levers 72 from hooks 73, and then manually applying upward force to the levers, the toggle links 71 may be thrust downward to lower wheels W 8 to 10 inches below the level of the drum wheels, and the levers may then be retained in the wheel-lowered positions by abutting the handle portion thereof against the upper ends of the forward post 20b of the axle, drum-wheel assembly.

Operation

Grading, planing and floating operations are obtained in our machine without use of the automatic leveling or bordering mechanisms. In such operations, the equalizer mechanism at both sides of the machine is connected rigidly between the axle assembly and rear portion of main frame F through the use of two of the links 27 to interconnect the respective arms 26b of the stabilizer shaft with the corresponding tongues 27a located thereabove near the rear of the main frame.

In floating, the blade is set perpendicularly to the longitudinal center line of the machine preferably using a steel plate (not shown) at each end of the blade to restrict escape of dirt therefrom.

When it is desired to level and/or border strips of land, the anchor link 27 at the side of the machine below crank shaft 28 is removed (as shown in Fig. 3), and the depending link 29 substituted, connected at its lower end with the corresponding equalizer arm 26b. The blade is then angled to the desired side and the appropriate bordering wing 67 swung outwardly and downwardly into position, as shown in Fig. 1, to receive from the rearward end of the adjusted blade. The blade depth is then adjusted from the driver's seat of the propelling tractor or the front of the machine (if self-propelled), through operation of the hydraulic jack 42. The adjusted depth may be read from the dial D mounted at the top of post 44, and the driver may, of course, also glance backward at the forward edge of the blade to determine approximately the amount of dirt being removed.

When it is desired to maintain the blade edge at a slight angle to the horizontal as in grading a road, the adjustment screws 51b may be adjusted (Fig. 8) to vary disalignment of control lever 51 and pendulum rod 50a.

Thereafter the machine travels forwardly over the ground, and through the closely cooperating combination of the elongated frame cradled at its rear end upon supports from the axle and drum-wheel assembly, and the equalizer mechanism and self-leveling mechanism, the adjusted blade will always be maintained with its cutting edge disposed horizontally obliquely transverse to the line of travel despite unevenness of terrain, rises or depressions over which the supporting drum-wheels 10 travel.

When one of the drum-wheels 10 passes over a hump or a depression out of horizontal alignment with the ground engagement of the opposite wheel, or when for any reason in travel, the axis of the drum-wheels becomes inclined to the true horizontal, gravity causes pendulum P to swing slightly in one direction or the other, thereby with its swinging movement shifting the supporting mounting for the central or large clutch or transmission element 54. The leveling shaft 22 is constantly driven in travel of the machine by driving connection with one of the wheel-drum axle shafts 10a. Consequently, slight shifting of the large bevel disc or transmission element 54 in either direction makes driving connection between said disc 54 and one or the other of the driven small bevel elements 55 or 56. If the large disc element 54 is engaged with element 55, it is driven and with it the endless chain 59 is driven in one direction, thereby through worm gear connection with the overhead shaft 28 swinging crank arm 28a in a predetermined direction. Such swinging in turn produces a predetermined operation on the depending link 29 connected at its lower end with the stabilizing arm 26b at the left side rear of the axle assembly, and causing the frame in its cradle to be tilted to change the spaced relation between the left side of the rear of frame F with its supporting axle structure. Such tilted position occurring in cradling action along substantially an axis longitudinal of the frame and at one side thereof, continues until the pendulum P through gravity returns to normal vertical position due to travel of both of the drum-wheels upon a common horizontal surface, whereupon clutch or driving engagement between the driven leveling shaft 22 and the central and large disc element 54 is disengaged.

Thus it will be seen that the beveled disc 54 shiftable from side to side by connection of its triangulated supporting frame therewith upon the swinging of the pendulum, constitutes a power-connecting element for applying power from shaft 22 to the endless chain 59. It will also be seen that the link 9 with the interconnected crank arm 28a of shaft 28 and the rack link 75 of the form illustrated in Fig. 9, constitutes in each instance a thrust element actuated upwardly or downwardly in response to the shifting of the control element of pendulum.

If the swinging of pendulum P is in the opposite direction from that first described, clutch or driving engagement between the second tapered transmission element 56 and bevel disc 54 is brought about, causing shaft 22 to drive the sprocket 58 and chain 59 in the opposite direction from that first described, with the attendant result that the overhead leveling shaft 28 is turned through an opposite direction, producing an opposite effect upon the depending link 29, and consequently an opposite tilting of frame F with respect to the supporting axle and drum-wheel assembly.

In actual practice, our machine has demonstrated a high degree of accuracy and immediate response to maintain in leveling, terracing and bordering operations, the cutting blade in a predetermined horizontal position regardless of variances in the slope or level of the terrain over which the drum-wheels travel. In this connection, the cooperation between the trailing mounting of the axle and drum-wheel assembly including the pivotal king bolt connection 25 with the central, longitudinal beam 9 of the frame, is important. Such trailing connection of the axle and drum-wheel assembly with the cooperating depth adjustment linkage including the heavy bell crank plate 45 and the heavy bar link 47, makes possible raising and lowering of the cutting edge of the blade with nevertheless the cradling tilting action while the rear of the frame is supported from the axle assembly.

From the foregoing description, it will be seen that a comparatively simple but highly efficient machine has been provided, adapted to move, grade, level and border soil and dirt. In preparing land for irrigation projects, grading and leveling close to the irrigating ditch may be accomplished with our machine and in leveling the blade through our automatic leveling mechanism and its related equalizer connection, maintains the cutting edge of the blade horizontal, regardless of variations in the inclination of the land over which the machine travels. When a field is properly leveled and bordered, washing will not occur at any point.

It further will be seen that leveling with attendant forming of borders of a desired height, is simultaneously accomplished in an efficient manner, with our machine.

Depth control of the cutting blade and angular adjustment of the blade relative to the line of travel are accomplished by manipulation of elements disposed at the very front of the machine, conveniently accessible to the driver.

It is of course understood that various changes may be made in the form, details and arrangement of parts without departing from the scope of the invention.

What is claimed is:

1. In a machine for cutting, moving, grading and leveling soil and the like, an elongated, generally horizontal frame having means for support at its forward end, a rear axle assembly supporting the rear end of said frame and having a pair of widely and transversely spaced, ground-engaging elements, means for connection of said assembly with said frame having provision for relative tilting of said frame to said assembly transversely of the machine and along a fulcrum disposed adjacent one of the longitudinal sides of said frame, a transversely disposed, soil-engaging blade supported below the rear portion of said frame and fixed thereto and movable therewith and having an overall operating width approximating the width of said frame, and pendulum-actuated, power-operated leveling mechanism mounted upon the rear portion of said frame and having linkage connection with at least one side of said axle assembly to tilt said frame on said fulcrum relative to said rear axle assembly by varying the spaced relation between the longitudinal sides thereof opposite from said fulcrum and the end of said axle assembly disposed therebelow when said ground-engaging elements pass over slopes or irregularities in the ground surface, thereby maintaining said blade in a predetermined, horizontal position.

2. The structure set forth in claim 1 wherein said automatic leveling mechanism, in addition to a pendulum, comprises a driven transmission element shiftable laterally of said frame with swinging of said pendulum, a transverse shaft supported from said frame and constantly driven when said machine is advanced in leveling operations, said shaft having a pair of spaced, driving, transmission elements between which said first mentioned transmission element is interposed normally in slightly spaced relation, said driving transmission elements being stationary in a direction endwise of the shaft, and actuating connections between said first mentioned driven transmission element and said rear axle assembly for producing relative transverse tilting between said frame and said axle asembly through differential spacing of one side of said frame above said axle assembly responsive to the swinging of said pendulum in one direction or the other.

3. In a machine for moving, grading and leveling soil, an elongated, generally horizontal frame having means for support at its forward end, a rear axle assembly supporting the rear end of said frame and having a pair of widely spaced, ground-engaging elements, said assembly having draft connection with the rear portion of said frame permissive of limited tilting of said frame transversely relative to said assembly, fulcrum means interposed between said assembly and said frame adjacent one longitudinal side of the machine to permit tilting of said frame adjacent said side on an axis longitudinal of said frame and the line of travel of the machine, a horizontal, tranversely disposed, soil-engaging blade fixedly supported below the rear of said frame and bodily movable therewith having a transverse operating width substantially equal to the width of the machine, a vertically adjustable mechanism interposed between the rear portion of said frame and said axle assembly for maintaining said frame and consequently, the depth of said blade at a multiplicity of heights relative to ground-engagement of said elements, a pendulum-actuated, automatic leveling mechanism mounted on the rear portion of said frame and including a rotary power-driven element on the frame and adapted for driving in opposite directions responsive to swinging movements of said pendulum, an equalizer mechanism mounted on said axle assembly and including a transverse, stabilizer shaft journaled on said axle assembly and having a pair of torque arms fixed thereto adjacent the opposite ends, a link for connecting in fixed spaced relation, one of said torque arms with one side of said frame and a connection link connecting said second torque arm at the opposite side of said axle assembly with the power-driven element of said self-leveling mechanism to vary the spaced relation between said connected parts, dependent upon the direction of rotation of said power-driven element.

4. In a machine for cutting, moving, leveling and bordering land and soil, an elongated, generally horizontal frame having means for support at its forward end, a rear axle assembly supporting the rear end of said frame and having a pair of widely and transversely spaced, ground-engaging elements, a horizontal, transversely disposed, soil-engaging blade supported below said frame and bodily movable therewith, means adjustably mounting the blade on the frame for movement to various oblique angles with respect to the forward direction of travel, vertically adjustable mechanism interposed between the rear of said frame and said rear axle assembly for maintaining said frame and consequently, the depth of said blade at a multiplicity of heights relative to the ground-engaging line of said elements and mechanism supported from said frame for forming a border in cooperation with the rearwardly disposed end of said blade when said blade is positioned obliquely to the line of travel of the machine, said mechanism comprising a wing at one side of said frame for operative positioning against and support upon the ground, means movably mounting said wing on the frame for movement into and out of operative ground-engaging position, the wing being oriented, in operative position, vertically and longitudinally of the line of travel of the machine in spaced relation from the rearmost end of said blade and at an acute angle thereto.

5. The structure set forth in claim 4 and automatic leveling mechanism mounted on the rear portion of said frame and having linkage connection with said axle assembly whereby said frame will be transversely tilted relative to ground-engagement of said ground-engaging elements to maintain said blade truly horizontal regardless of fluctuation of the axles of said assembly when said ground-engaging elements pass over slopes or irregularities in the ground surface.

6. In a machine for moving, grading and leveling soil, an elongated, generally horizontal frame having means for support at its forward end, a rear axle assembly supporting the rear end of said frame and having a pair of widely spaced, ground-engaging elements, said frame at the rear thereof being cradled on said assembly for limited tilting of said frame transversely relative to the travel of said frame and along a fulcrum extending longitudinally of said frame and the travel of the machine and adjacent one side thereof, a horizontal transversely disposed soil-engaging blade fixedly supported below the rear of said frame and bodily movable therewith and having an effective operating length approximately equal to the width of the machine in a transverse direction to the line of travel, a vertically adjustable mechanism interposed between the rear portion of said frame and the medial portion of said axle assembly for vertically adjusting the height of the rear of said frame and consequently, the depth of said blade relative to ground-engagement of said ground-engaging elements, an equalizer mechanism associated with said vertically adjustable mechanism and mounted upon said rear axle assembly and comprising a transverse stabilizer shaft journaled on said axle assembly and having torque arms affixed to the end portions thereof, a link connecting one of said torque arms to said frame to maintain a fixed spaced relation between the connected end of said torque arm and said frame and to provide a fulcrum for the transverse tilting of said frame, and a pendulum-actuated, automatic leveling mechanism mounted on the rear portion of said frame and including a connecting and thrust element actuated upwardly or downwardly relative to the frame in response to the swinging of said pendulum when one of said ground-engaging elements passes over slopes or irregularities in the ground surface, and said connecting and thrust element having a lower end connected with the other of said torque arms.

7. In a machine for moving, grading and leveling soil, an elongated, generally horizontal frame having means for support at its forward end, a rear axle assembly supporting the rear end of said frame and having a pair of widely spaced, ground-engaging elements, said frame at the rear thereof being fulcrumed on said assembly for limited tilting of said frame transversely relative to the travel of said frame and along a fulcrum extending longitudinally of said frame and adjacent one side thereof, a horizontal, transversely disposed soil-engaging blade fixedly supported below the rear portion of said frame and bodily movable therewith, and having a length at least equal to the width of the machine in a transverse direction to the line of travel, vertically adjustable mechanism interposed between the rear portion of said frame and the medial portion of said axle assembly for vertically adjusting the height of the rear of said frame and consequently the depth of said blade relative to ground-engagement of said ground-engaging elements, an equalizer mechanism associated with said vertically adjustable mechanism and mounted upon said rear axle assembly and comprising a transverse stabilizer shaft journaled on said axle assembly and having radial arms affixed to the end portions thereof, a link connecting one of said radial arms to said frame to maintain a fixed spaced relation between the connected end of said radial arm and said frame and disposed on the opposite side of said frame from said fulcrum, and power-actuated automatic leveling mechanism mounted on the rear portion of said frame and including a gravity-actuated shiftable control element, a power-connecting element and a connecting and thrust element actuated upwardly or downwardly relative to the frame in response to the shifting of said control element when one of said ground-engaging elements passes over slopes or irregularities in the ground surface and said connecting and thrust element having a lower end connected with the other of said radial arms to turn said stabilizer shaft in one or the other directions thereby tilting said frame along its fulcrum through said link connection of the other end of said stabilizer shaft with the second radial arm.

8. In a machine for cutting, moving, grading and leveling soil and the like, an elongated, generally horizontal frame having means for support at its forward end, a rear axle assembly supporting the rear end of said frame and having a pair of widely and transversely spaced, ground-engaging elements, means for connection of said assembly with said frame having provision for relative tilting of said frame to said assembly transversely of the machine, a fulcrum extending longitudinally of the machine and line of travel thereof and closely adjacent one of the longitudinal sides of said frame, a transversely disposed depending soil-cutting blade fixedly supported below the rear portion of said frame and movable therewith and having an overall operating width approximating the width of said frame, and power-actuated automatic leveling mechanism for said blade mounted upon the rear portion of said frame and including a transversely shiftable, gravity-actuated control element, a power-connecting element subject to the control of the last mentioned control element and a thrust element actuated upwardly or downwardly relative to said rear axle assembly through power connected therewith as controlled by said shiftable control element to tilt said frame on said fulcrum when one of said ground-engaging elements passes over slopes or irregularities in the ground surface and to thereby maintain said soil-cutting blade at its desired set and approximately horizontal position.

References Cited in the file of this patent
UNITED STATES PATENTS

| | | |
|---|---|---|
| 437,461 | Starbuck | Sept. 30, 1890 |
| 905,985 | Clove | Dec. 8, 1908 |
| 1,821,271 | Musgrove et al. | Sept. 1, 1931 |
| 2,142,985 | Arndt | Jan. 10, 1939 |
| 2,156,190 | Neuman | Apr. 25, 1939 |
| 2,368,219 | Heath | Jan. 30, 1945 |
| 2,567,805 | Doerfler | Sept. 11, 1951 |
| 2,583,250 | Ball | Jan. 22, 1952 |
| 2,734,293 | Barnes | Feb. 14, 1956 |